United States Patent [19]

Blease

[11] Patent Number: 5,016,385
[45] Date of Patent: May 21, 1991

[54] SELF-POWERED BAIT TROLLING MECHANISM

[75] Inventor: Wilfred J. Blease, Merrimack, N.H.

[73] Assignee: Pioneer Plastics, Inc., Greenville, N.H.

[21] Appl. No.: 514,509

[22] Filed: Apr. 25, 1990

[51] Int. Cl.⁵ ............................................. A01K 97/00
[52] U.S. Cl. ..................................................... 43/26.1
[58] Field of Search ...................... 43/43.13, 43.1, 27.4, 43/26.1, 6.5, 3; 242/106

[56] References Cited

U.S. PATENT DOCUMENTS

| | | | |
|---|---|---|---|
| 1,850,296 | 3/1932 | Vermeulen | 43/26.1 |
| 2,693,047 | 11/1954 | Lumsden | 43/26.1 |
| 2,726,471 | 12/1955 | Uus | 43/26.1 |
| 3,036,403 | 5/1962 | Presnell | 43/26.1 |
| 3,613,284 | 10/1971 | Anderson | 43/26.1 |
| 3,739,516 | 6/1973 | Holling | 43/26.1 |
| 4,638,585 | 1/1987 | Korte | 43/26.1 |

FOREIGN PATENT DOCUMENTS

| | | | |
|---|---|---|---|
| 0254485 | 1/1988 | European Pat. Off. | 43/43.1 |
| 3317187 | 11/1984 | Fed. Rep. of Germany | 43/26.1 |

Primary Examiner—Kurt Rowan
Attorney, Agent, or Firm—Hamilton, Brook, Smith & Reynolds

[57] ABSTRACT

A floating, self-powered bait trolling mechanism having a battery-operated motor for rotating a propellor about a primary axis with a flotation chamber located above the motor. Stabilizing fin means are positioned in a plane, which includes the axis and which fin means mount a rudder behind the propeller. There are means for securing a control line to the mechanism at a first location and means for securing a bait attaching line to the mechanism at a second location.

3 Claims, 4 Drawing Sheets

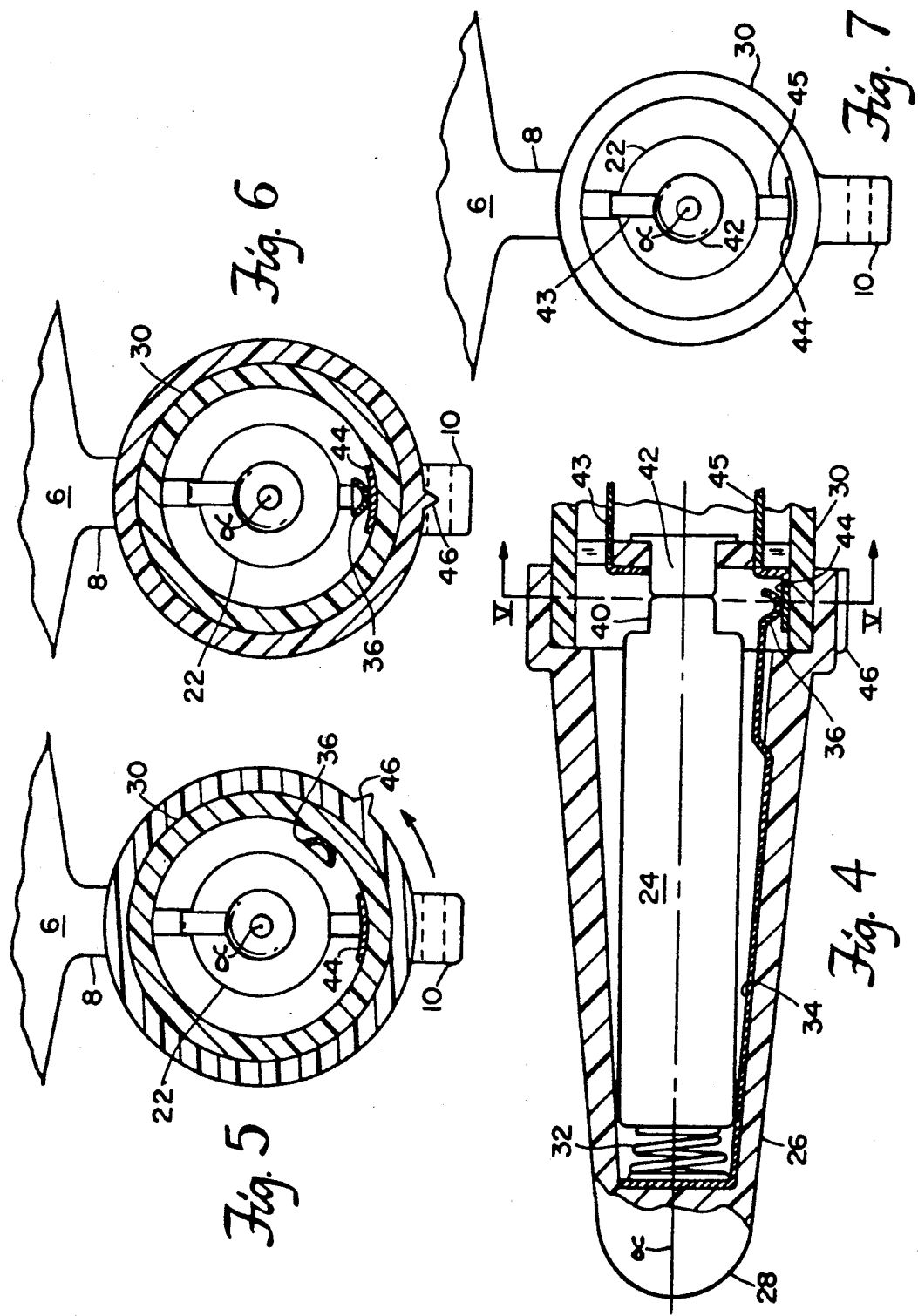

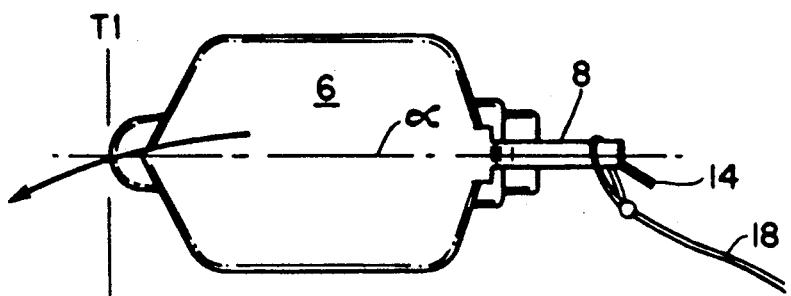
Fig. 8A
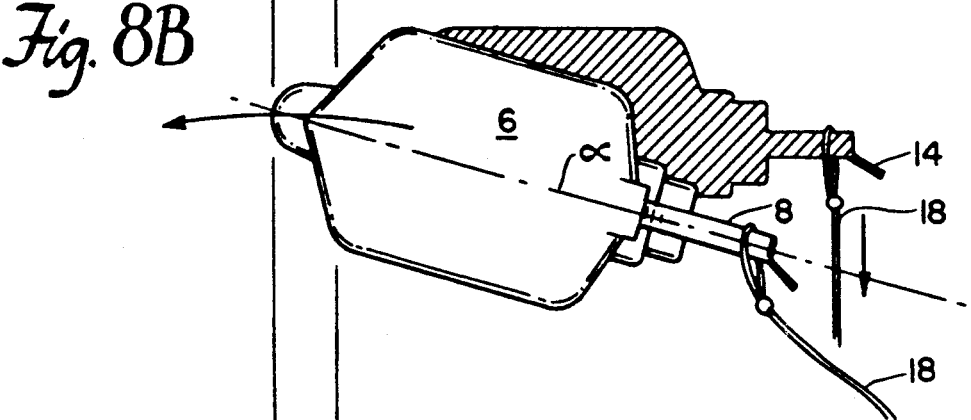
Fig. 8B
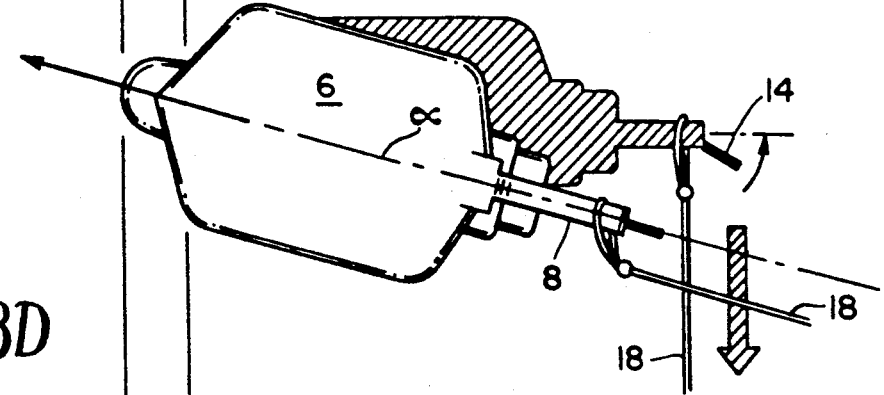
Fig. 8C
Fig. 8D
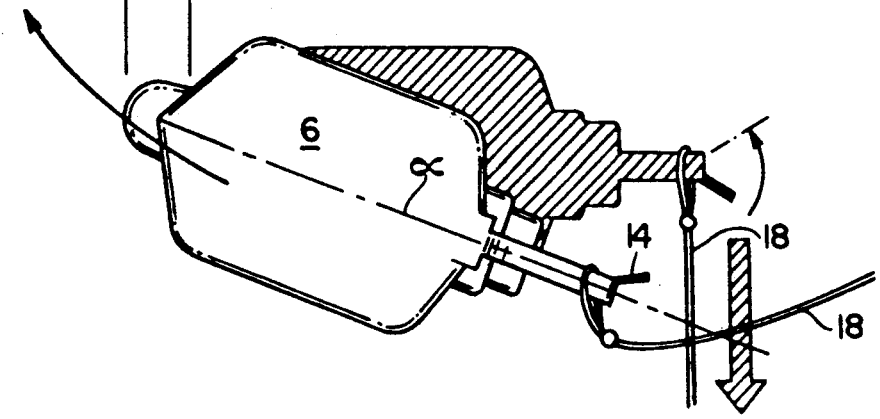

SELF-POWERED BAIT TROLLING MECHANISM

FIELD OF THE INVENTION

This invention relates to fishing in general and, more particularly, to a self-powered bait trolling mechanism.

BACKGROUND OF THE INVENTION

Bait trolling is normally performed by a fisherman with rod, reel and line, the bait being attached to this line and pulled behind a moving boat. When the boat moves in a straight line, so does the bait. When the boat is turned, the bait will also move in a generally curved path. However, the radius of the curve is limited by how tightly the boat can turn. At times, it is desirable to troll or pull a bait through the water in a much narrower, circular pattern than can be performed by pulling it behind a boat.

Another method for trolling is for a fisherman to cast the bait from the shore or a boat and then reel the line back in, which causes the bait to travel toward him in a substantially linear path. By manipulation of the rod and by varying the speed of reeling, the speed and motion of the moving bait can be controlled. It can be a jerky motion, smooth motion, stop and go motion, etc. but, again, it is limited for the most part to a linear path. Obviously, a skillful fisherman can cast a bait into a flowing stream allowing it to float and move with the stream while reeling it in which will give a motion to the bait in a arcuate path determined by the speed with the stream and the speed of which it is reeled in. However, the path is almost straight.

It is an object of this invention to create a mechanism which will troll or pull a bait through the water in a small, circular path and which mechanism can be adjusted to change the radius of the circle. It is also an object to provide trolling mechanism which can be preset to move a bait in one circular path and then have it change without recasting, to a different circular path. It is even more desirable to provide and have another bait trolling mechanism which may be set to troll bait in a clockwise direction and then change it to a counter-clockwise direction, or vice versa, without removing it from the water.

And yet another object of this invention is to provide a bait trolling mechanism which may be used under ice to move a bait in a circular or linear path. For the most part, ice fishing is performed by cutting a hole in the ice, lowering a bait through the hole toward the bottom wherein it remains either stationary or moved vertically up and down. There is little opportunity, because of the restriction of the size of the hole, to move the bait in any direction other than vertically.

Another object of this invention is to create a bait trolling mechanism which will move a bait beneath the ice in a circular path in either clockwise or counter-clockwise directions, or both.

It is also an object to provide such mechanism to troll directly below the ice or close to the bottom. It is to the accomplishment of the above objectives that this invention is directed.

SUMMARY OF THE INVENTION

The invention resides in a floating, self-powered bait trolling mechanism. It includes a battery-operated motor for rotating a propeller about a primary axis. The battery and motor are contained in a water-tight housing having two parts which are separable and rotatable relative to each other. A switch is contained within the housing which can be turned from off to on by rotation of one part of the housing relative to the other.

There are stabilizing fins which are located in a plane which includes the primary axis. The stabilizing fins also serve as mounting means for a rudder which is manually adjustable angularly relative to an axis which extends at right angles to the primary axis.

There are means for securing a control line, in this instance the fishing line, to the mechanism at a first location which is located above and in close proximity to the rudder. There are second means for securing a bait attaching line to the mechanism at a second location which is beneath the housing and spaced forwardly of the propeller.

The entire mechanism depends from a hollow, water-tight flotation chamber, which is located above the motor and which provides buoyancy for the trolling mechanism.

The rudder is located between the stabilizing fins on a pin or shaft and may be set in a selected position of angular adjustment to cause the trolling mechanism to move in a circle in either s clockwise or counter-clockwise directions. When the rudder is aligned along the primary axis, the trolling mechanism will move in a straight line.

There is sufficient angular rigidity to the rudder mount such that when the control or fishing line is pulled gently, the rudder maintains its angular adjustment and the rear or trailing end of the mechanism is moved, thus changing the direction but not the radius about which the mechanism is traveling.

A sharper tug on the line causes the rudder to be displaced into a new angular position by the resistance of the water whereby the trolling mechanism will then proceed in a totally different direction or even in the opposite direction from that in which it was originally traveling.

The above and other features of the invention, including various novel details of construction and combinations of parts will now be more particularly described with reference to the accompanying drawings and pointed out in the claims. It will be understood that the particular self-powered bait trolling mechanism embodying the invention is shown by way of illustration only and not as a limitation of the invention. The principals and features of this invention may be employed in varied and numerous embodiments without departing from the scope of the invention.

BRIEF DESCRIPTION OF THE DRAWINGS

FIG. 4 is an enlarged view, partially in section of the motor housing.

FIG. 5 is a sectional view taken along the line V—V on FIG. 4.

FIG. 6 is also a sectional view also taken along the line V—V of FIG. 4, but with the motor housing in a different position of rotational adjustment.

FIG. 7 is a view looking into the motor housing.

FIG. 8A is a top schematic view of the mechanism set to travel in a counter-clockwise circle.

FIG. 8B shows the mechanism after it has been tugged lightly by the fishing line.

FIG. 8C shows a view of the mechanism traveling in a straight line after a second and stronger tug has been applied by the fishing line.

FIG. 8D is the mechanism traveling in a clockwise circle after still another strong tug has been administered to it by the fishing line.

DETAILED DESCRIPTION OF THE INVENTION

Figure 1:
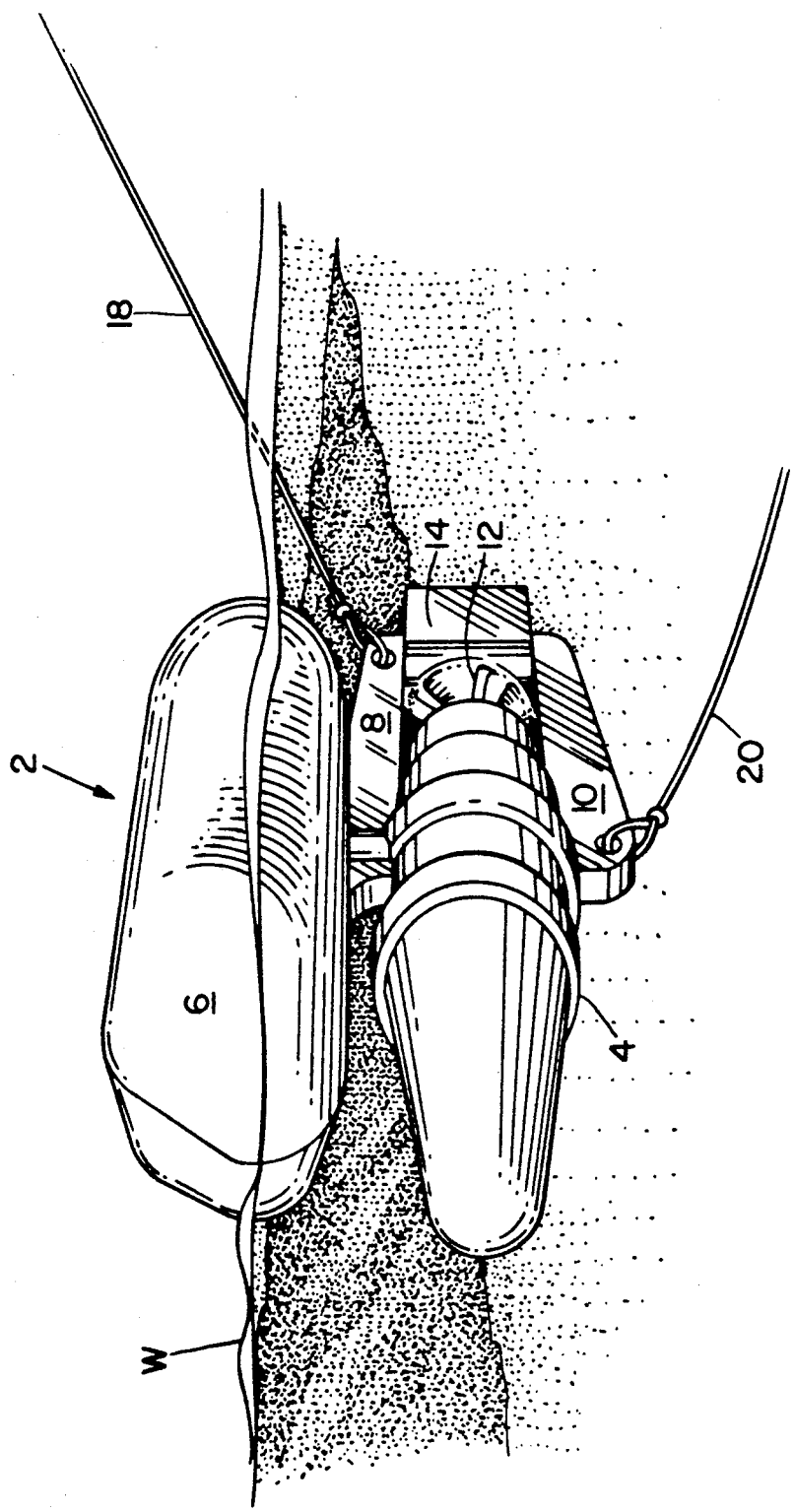
FIG. 1 is a perspective view of a self-powered bait trolling mechanism embodying the invention.
Figure 2:
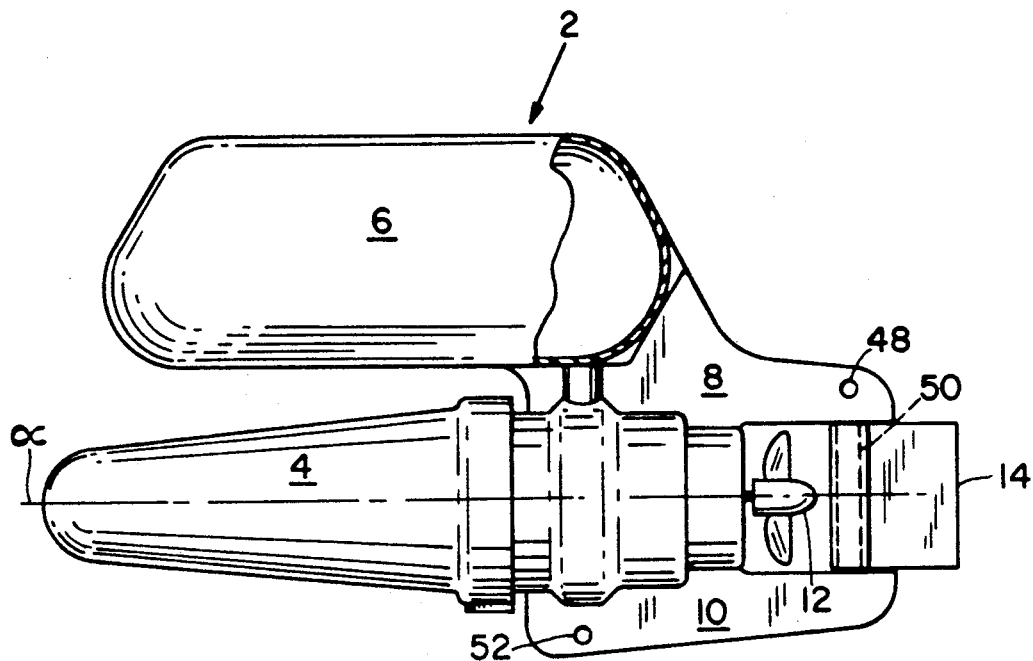
FIG. 2 is a left-side view thereof.
Figure 3:
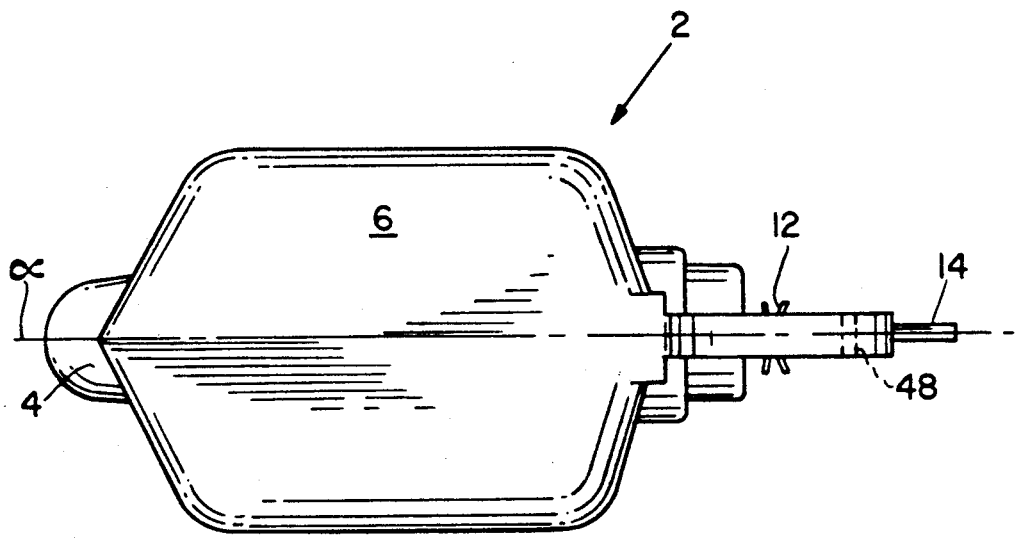
FIG. 3 is a plan view thereof.

Referring to FIG. 1, a floating, self-powered bait trolling mechanism generally indicated 2 will be seen. It includes a water-tight motor housing 4, an air-tight flotation chamber 6, an upper stabilizing fin 8, a lower stabilizing fin 10, a propeller 12, a rudder 14, a control line 18 (which is actually a fishing line), and a bait attaching line 20.

As will be seen, a part of the flotation chamber is shown above the water W, with the motor housing 4, the propeller 12 and stabilizing fins 8 and 10 below water. The depth at which the mechanism floats may be controlled by adding a weight to the bottom fin 10

The propeller 12 rotates about a primary axis alpha which is the axis of rotation of the armiture (not shown) of a motor 22 (FIG. 7). Also lying on the axis is the center of a battery 24 (FIG. 4) and the center of a first and moveable portion 26 of the motor housing 4. The first portion 26 of the motor housing is generally conical in shape, having a blunted nose 28 and which is press fit for rotation on a generally cylindrical second stationary portion of the motor housing 4.

The negative end of the battery bears against a compression spring 32, which makes contact with an "L" shaped metallic strip 34 secured against rotation in the first portion 26 of the housing. It extends to the right, as viewed in FIG. 4, and terminates in a bulbous contact 36.

The positive end of the battery 40 engages a contact button 42 which is joined by metallic contact 43 to one side of the motor. The bulbous contact 36 is engageable with a stationary contact 44 secured in the second portion 30 of the housing 4. A conductor 45 joins the contact 44 to the other side of the motor 22.

When the moveable or forward portion 26 of the motor housing 4 is rotated relative to the second or generally stationary portion 30, from the FIG. 5 position to the position shown in FIG. 6, the bulbous contact 36 engages the contact 44 thereby turning on the motor causing the propeller to rotate.

When turning the motor on, the forward portion 26 at the housing is rotated until a V-shaped projection 46 points directly downwardly relative to the axis alpha, indicating that moveable contact 36 is engaged with stationary contact 44.

The control line 18 is secured to a hole 48 in the upper fin portion 8 close to the rudder 14. The control line 18 actually is the fishing line which is secured in conventional fashion to a reel on a pole. The rudder 14 is pivotally mounted for manual adjustment on a pin or shaft 50 which is mounted between the upper and lower stabilizing fin portions 8 and 10, normal to this primary axis alpha.

The rudder 14, as well as the other portions of the trolling mechanism, is made of molded plastic. The rudder is pressed onto the pin 50 such that it may be manually adjusted and maintained in any angular position or setting. However, it is intentionally made to be yieldable upon the application of pressure while the mechanism is trolling, as will be explained in more detail hereinafter.

The bait attaching line 20 is secured through a hole 52 in the forward portion of the lower stabilizing fin 10 as far away as conveniently possible from the propeller 12 so it will not become entangled. The hole 48 for the control line is located as close to the stern or rudder end of the mechanism as is possible and, as shown in the drawings, is located substantially above the rudder pin 50.

Referring to the FIG. 8A, with the bait line attached, the rudder 14 is adjusted to port to a position to cause the trolling mechanism to troll in a counter-clockwise circle as indicated by the arrow at its forward end. The line T1 is a time line designating the time the trolling mechanism is cast into the water.

At some desired subsequent time T2, it may be desirable that the trolling mechanism proceed in a different circle but at the same radius. The center of the circle can be displaced by a gentle pull on the control or fishing line 18. This moves the mechanism from the cross-hatched line position of FIG. 8B to the solid line position. It should be noted that the rudder 14 has not changed its angular relationship to the principal axis alpha. However, the mechanism will still proceed in a counter-clockwise direction in a circle of identical radius but with the center of that radius displaced to port.

If, however, it is desired that the trolling mechanism proceeds in a straight line, a sharper tug will be applied to the line in the direction of the cross-hatched arrow in FIG. 8C. This sharp tug will cause the rudder to straighten out relative to the axis alpha. This is due to the then increased force caused by the water pressing on the port side of the rudder moving it from the position in the cross-hatched view to the solid-line view of FIG. 8C. After the rudder has been straightened out, the mechanism will proceed in a direction aligned with its own principal directional axis alpha.

These results are obtained because the force with which the rudder 14 is fitted onto its pin 50 is such that a light movement of the line 18 will not cause the water pressure on the rudder to change its angular alignment. However, a more substantial water pressure caused by a stronger tug or jerk on the line will do so.

If it is desired to cause the bait trolling mechanism 2 to proceed in a clockwise circle, a still stronger tug or a subsequent pull will be applied to the stern of the trolling mechanism causing the pressure of the water on the port side of the rudder to rotate the rudder from the cross-hatched position shown in FIG. 8D, to the solid-line position, thus, causing the mechanism, beginning at time T2 to proceed in a clockwise circle.

All of the above is accomplished because the rudder has sufficient angular rigidity to control the direction of the movement of the mechanism when the propeller is rotated. However, the rudder is moveable to different angular positions by the force of the water against it caused by a sharp tug of the control line.

It will be understood that whereas the diagrammatic showings in FIGS. 8A to 8D show the stern of the mechanism being pulled to port, equal but opposite results occur if the mechanism is pulled with the control line 18 extending to starboard.

The invention has particular value when ice fishing. Since ice fishing is generally performed by dropping a line vertically downwardly through a small hole in the ice, there is little opportunity to cause the bait to move in any direction other than up and down. However, by releasing the bait trolling mechanism into the hole in the ice with the rudder set in any desired position, the mechanism will travel beneath the ice surface into and out of air pockets while trolling a bait behind it in a circular pattern determined by the angle of the rudder or, if desired, in a totally straight pattern. Furthermore, adding a weight to the mechanism will cause it to sink to a depth controlled by the fishing line.

I claim:

1. A floating, self-powered bait trolling mechanism, comprising:
    (a) a battery-operated motor in a watertight housing for rotating a propeller about a primary axis;
    (b) a first stabilizing fin located above the primary axis and projecting upwardly from the housing and a second stabilizing fin coplanar with the first fin located below the primary axis and projecting downwardly from the housing;
    (c) an airtight flotation chamber having greater width than the housing and mounted on the first stabilizing fin, the chamber being spaced from the housing;
    (d) a pin extending between the first and second stabilizing fins on an axis which is normal to the primary axis and behind the propeller;
    (e) a rudder press fit onto the pin with sufficient angular rigidity to control the direction of movement of the mechanism when the propeller is rotated;
    (f) the press fit force between the rudder and the pin being insufficient to prevent angular movement relative to the pin by water pressure against the rudder caused by a sharp tug applied to the mechanism;
    (g) a control line attached to the first stabilizing fin rearwardly of the propeller and above the rudder; and,
    (h) a bait attaching line attached to the second stabilizing fin forwardly of the propeller and below the rudder.

2. A bait trolling mechanism according to claim 1 wherein there is an off/on switch in the housing controlled by rotating a first part of the housing relative to a second part.

3. A bait trolling mechanism according to claim 1 wherein there are motor switch means in the housing coupled with an off/on indicator outside the housing.

* * * * *